(12) United States Patent
Ma

(10) Patent No.: US 12,092,505 B2
(45) Date of Patent: Sep. 17, 2024

(54) LIQUID LEVEL MEASUREMENT CIRCUIT, APPARATUS AND METHOD

(71) Applicant: SHENZHEN ANYCUBIC TECHNOLOGY CO., LTD., Shenzhen (CN)

(72) Inventor: Ning Ma, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/518,493

(22) Filed: Nov. 23, 2023

(65) Prior Publication Data

US 2024/0085232 A1 Mar. 14, 2024

Related U.S. Application Data

(63) Continuation of application No. PCT/CN2022/094935, filed on May 25, 2022.

(30) Foreign Application Priority Data

May 27, 2021 (CN) .......................... 202110585414.5

(51) Int. Cl.
*G01F 23/24* (2006.01)
(52) U.S. Cl.
CPC .......... *G01F 23/243* (2013.01); *G01F 23/242* (2013.01)
(58) Field of Classification Search
CPC ............................................. G01F 23/24–245
See application file for complete search history.

(56) References Cited

U.S. PATENT DOCUMENTS 5,058,421 A * 10/1991 Alexander ............ G01F 23/241
73/304 R
5,785,142 A * 7/1998 Lo .......................... B60K 28/10
73/304 R
(Continued)

FOREIGN PATENT DOCUMENTS

CN 101556178 A 10/2009
CN 101975603 A * 2/2011
(Continued)

OTHER PUBLICATIONS

CN 210375319 (Year: 2020).*

*Primary Examiner* — Justin N Olamit
(74) *Attorney, Agent, or Firm* — Bayramoglu Law Offices LLC

(57) ABSTRACT

A liquid level measurement circuit includes: a probe, a reference electrical signal module and a potential conversion module, where the probe extends into a liquid level accommodation body, and the liquid level accommodation body accommodates a measurement liquid module. If the liquid level of said liquid is lower than a preset liquid level, a positive electrode conductor and/or a negative electrode conductor are/is not immersed in the measurement liquid, and an output end of the potential conversion module outputs a first electrical signal; and if the liquid level of the measurement liquid is not lower than the preset liquid level, the positive electrode conductor and the negative electrode conductor are immersed in the measurement liquid, and the output end of the potential conversion module outputs a second electrical signal. The accuracy of liquid level measurement can be improved.

14 Claims, 9 Drawing Sheets

(56) References Cited

U.S. PATENT DOCUMENTS

| | | | | | |
|---|---|---|---|---|---|
| 5,793,294 | A | * | 8/1998 | Schepka | G01F 23/243 73/304 R |
| 6,223,595 | B1 | * | 5/2001 | Dumbovic | G01F 23/24 73/304 R |
| 6,264,434 | B1 | * | 7/2001 | Frank | F04F 1/02 417/130 |
| 6,332,349 | B1 | * | 12/2001 | Poynot | G01N 33/0022 73/863.33 |
| 6,603,319 | B1 | * | 8/2003 | Kasahara | H05K 1/0268 324/696 |
| 10,647,055 | B2 | * | 5/2020 | Wynne | B29C 64/124 |
| 10,737,503 | B2 | * | 8/2020 | Hara | B41J 2/175 |

FOREIGN PATENT DOCUMENTS

| | | | | |
|---|---|---|---|---|
| CN | 102680049 | A | | 9/2012 |
| CN | 202974383 | U | | 6/2013 |
| CN | 204831461 | U | | 12/2015 |
| CN | 108801390 | A | | 11/2018 |
| CN | 208795322 | U | | 4/2019 |
| CN | 210375319 | U | * | 4/2020 |
| CN | 212082519 | U | | 12/2020 |
| CN | 113324618 | A | | 8/2021 |
| WO | WO-2008143588 | A1 | * | 11/2008 ........... G01F 23/243 |

\* cited by examiner

A-A

LIQUID LEVEL MEASUREMENT CIRCUIT, APPARATUS AND METHOD

CROSS REFERENCE TO THE RELATED APPLICATIONS

The present application is a continuation application of International Application No. PCT/CN2022/094935 filed on May 25, 2022, which is based upon and claims priority to Chinese Patent Application No. 202110585414.5 filed on May 27, 2021, the entire contents of which are incorporated herein by reference.

TECHNICAL FIELD

The present application belongs to the technical field of liquid level measurement, and particularly relates to a liquid level measurement circuit, apparatus and method.

BACKGROUND

In related art, liquid level measurement is realized by arranging a buoy in a liquid containing device and measuring the level of the buoy by means of a photoelectric switch, a microswitch, etc. However, when a measurement liquid is viscous, the buoy may be stuck by the liquid to cause mismatch between the buoy and the liquid level, resulting in an inaccurate liquid level measurement result.

It can be seen from the above that a liquid level measurement apparatus in the related art suffers from the defect of an inaccurate liquid level measurement result.

SUMMARY

An objective of the embodiments of the present application is to provide a liquid level measurement circuit, apparatus and method, which can solve the problem that a liquid level measurement apparatus in the related art has an inaccurate liquid level measurement result.

In order to solve the above technical problem, the present application is implemented as follows.

In a first aspect, an embodiment of the present application provides a liquid level measurement circuit, including: a probe, a reference electrical signal module, and a potential conversion module, where the probe extends into a liquid accommodation body, and a measurement liquid is accommodated in the liquid accommodation body;

the probe includes a positive electrode conductor and a negative electrode conductor which are arranged spaced apart from each other, and the positive electrode conductor is electrically connected to an external power source;

the potential conversion module includes a first end, a second end, and an output end, where the first end of the potential conversion module is electrically connected to the reference electrical signal module such that the first end of the potential conversion module has a reference electrical signal, and the second end of the potential conversion module is electrically connected to the negative electrode conductor;

where if the liquid level of the measurement liquid is lower than a preset liquid level, at least one of the positive electrode conductor and the negative electrode conductor is not immersed in the measurement liquid, the positive electrode conductor and the negative electrode conductor are electrically insulated from each other, such that an electrical signal at the second end of the potential conversion module has a smaller value than the reference electrical signal, and the output end of the potential conversion module outputs a first electrical signal; and if the liquid level of the measurement liquid is not lower than the preset liquid level, the positive electrode conductor and the negative electrode conductor are immersed in the measurement liquid, the positive electrode conductor is electrically connected to the negative electrode conductor by means of the measurement liquid, such that the electrical signal at the second end of the potential conversion module has a larger value than the reference electrical signal, and the output end of the potential conversion module outputs a second electrical signal.

Optionally, the liquid level indicating module is electrically connected to the output end of the potential conversion module, if the liquid level indicating module receives the first electrical signal, prompt information indicative of a low liquid level is output.

Optionally, the liquid level indicating module includes: a transistor and a light-emitting diode, where a first end of the transistor is electrically connected to the output end of the potential conversion module, a second end of the transistor is electrically connected to a power source and a first end of the light-emitting diode, a second end of the light-emitting diode is electrically connected to a power source, and a third end of the transistor is grounded;

if the first end of the transistor receives the first electrical signal, the second end of the transistor is connected to the third end of the transistor to cause the light-emitting diode to emit light; and if the first end of the transistor receives the second electrical signal, the second end of the transistor is disconnected from the third end of the transistor to cause the light-emitting diode not to emit light.

Optionally, the reference electrical signal module includes: a first resistor and a second resistor; where a first end of the first resistor is electrically connected to a power source, a second end of the first resistor is electrically connected to the first end of the potential conversion module and a first end of the second resistor, and a second end of the second resistor is grounded; and the second resistor is an adjustable resistor, and a resistance value of the second resistor is related to the electrical conductivity of the measurement liquid, such that if the probe is immersed in the measurement liquid, the values of the electrical signals at the first end and the second end of the potential conversion module have a first magnitude relationship, and if the probe is not immersed in the measurement liquid, the values of the electrical signals at the first end and the second end of the potential conversion module have a second magnitude relationship, the first magnitude relationship being different from the second magnitude relationship.

In a second aspect, an embodiment of the present application provides a liquid level measurement apparatus, including: a liquid level measurement circuit according to the first aspect.

Optionally, the liquid level measurement apparatus further includes: a vacuum pump, a first pipeline, and a second pipeline, where the vacuum pump is in communication with an accommodating bottle containing a supplementary liquid through the first pipeline;

a first end of the second pipeline is in communication with the accommodating bottle, and a second end of the second pipeline is used to supplement a liquid into the liquid accommodation body;

the vacuum pump is configured to blow air into the accommodating bottle through the first pipeline if the potential conversion module outputs a first electrical signal, so as to cause the supplementary liquid in the accommodating bottle to enter the liquid accommodation body through the second pipeline; and if the potential conversion module outputs a second electrical signal, the vacuum pump stops operating.

Optionally, a solenoid valve group is arranged in the first pipeline, and the solenoid valve group is configured to change an air flow direction in the second pipeline when operating.

Optionally, the solenoid valve group includes a first solenoid valve and a second solenoid valve, each solenoid valve including a first port, a second port, and a third port, the first port and the second port being connected to each other when the solenoid valve is closed, and the second port and the third port being connected to each other when the solenoid valve is opened.

The liquid level measurement apparatus further includes a tee joint.

The first pipeline includes a first pipe, a second pipe, a third pipe, a fourth pipe, and a fifth pipe, the second port of the first solenoid valve is in communication with an air inlet end of the vacuum pump through the first pipe, an air outlet end of the vacuum pump is in communication with the second port of the second solenoid valve through the second pipe, the first port of the second solenoid valve is connected to the first port of the tee joint through the third pipe, the second port of the tee joint is in communication with the accommodating bottle through the fourth pipe, and the third port of the tee joint is in communication with the third port of the first solenoid valve through the fifth pipe.

Optionally, the liquid level measurement apparatus further includes: a clamping and fixing structure, where
the probe in the liquid level measurement circuit is fixed to the clamping and fixing structure, and the clamping and fixing structure has a relaxed state and a clamping state;
where in the relaxed state, at least one of the positive electrode conductor and the negative electrode conductor in the liquid level measurement circuit is not in contact with the measurement liquid in the liquid accommodation body; and in the clamping state, if the measurement liquid in the liquid accommodation body is higher than a preset liquid level, the positive electrode conductor and the negative electrode conductor in the liquid level measurement circuit are both in contact with the measurement liquid.

Optionally, materials of the positive electrode conductor and the negative electrode conductor in the liquid level measurement circuit include an anti-oxidation material.

In a third aspect, an embodiment of the present application provides a liquid level measurement method for application in a 3D printing device, the 3D printing device including a liquid level measurement apparatus according to the second aspect, the method including:
controlling a vacuum pump to blow air into an accommodating bottle through a first pipeline if a liquid level measurement circuit outputs a first electrical signal, so as to cause a supplementary liquid in the accommodating bottle to enter a liquid accommodation body through a second pipeline; and controlling the vacuum pump to stop operating if the liquid level measurement circuit outputs a second electrical signal.

Optionally, controlling the vacuum pump to stop operating if the liquid level measurement circuit outputs a second electrical signal includes:
generating, if the liquid level measurement circuit outputs the second electrical signal, a first control signal based on the second electrical signal, and generating a second control signal after a preset time;
adjusting a valve state of a solenoid valve group based on the first control signal to adjust an air flow direction in the second pipeline to a second direction, the second direction being a direction from the liquid accommodation body to the accommodating bottle, such that the supplementary liquid in the second pipeline enters the accommodating bottle under a pressure; and
controlling the vacuum pump and the solenoid valve group to stop operating based on the second control signal.

In the embodiment of the present application, if the liquid level of the measurement liquid is not lower than the preset liquid level, the negative electrode conductor and the positive electrode conductor are located in the measurement liquid, such that the negative electrode conductor is connected to the positive electrode conductor by means of the measurement liquid. In this case, an electrical signal on the negative electrode conductor is larger than the reference electrical signal, such that the potential conversion module outputs the second electrical signal. If the liquid level of the measurement liquid is lower than the preset liquid level such that at least one of the negative electrode conductor and the positive electrode conductor leaves the measurement liquid, the negative electrode conductor is arranged insulated from the positive electrode conductor. In this case, the electrical signal on the negative electrode conductor is less than the reference electrical signal, such that the potential conversion module outputs the first electrical signal, and thus whether the liquid level of the measurement liquid is too low can be determined based on a different electrical signal output by the potential conversion module. Since the probe is used to measure the liquid level in the implementations of the present application, the probe is not stuck like a buoy when the liquid level of a viscous liquid is measured, such that the accuracy of a liquid level measurement result can be improved.

DETAILED DESCRIPTION OF THE EMBODIMENTS

Figure 1:
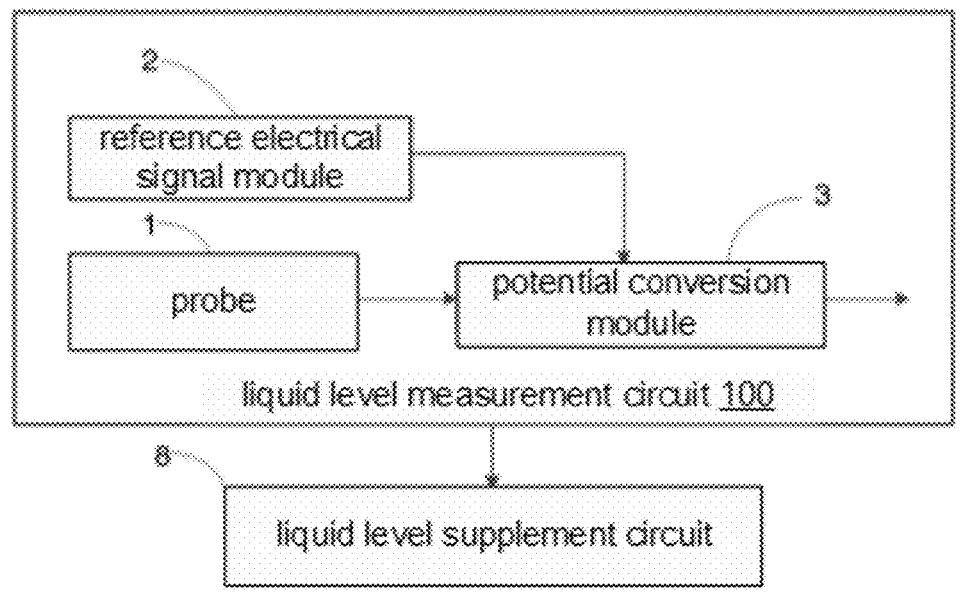
FIG. 1 is a schematic diagram of a module structure of a liquid level measurement circuit according to an embodiment of the present application.

The technical solutions in the embodiments of the present application will be clearly and completely described below in conjunction with the accompanying drawings in the embodiments of the present application. Apparently, the embodiments described are some rather than all of the embodiments of the present application. All the other embodiments obtained by those of ordinary skill in the art based on the embodiments of the present application without creative efforts shall fall within the scope of protection of the present application.

The terms "first", "second", etc. in the description and claims of the present application are used to distinguish similar objects, and are not used to describe a specific order of precedence. It should be understood that the data used in this way may be interchanged where appropriate, so that the embodiments of the present application can be implemented in an order other than those shown or described herein, and the terms "first", "second", etc. are used to distinguish between objects generally of a same type, rather than to limit the number of the objects. For example, there may be one first object, or there may be more first objects. In addition, "and/or" in the description and the claims indicates at least one of connected objects, and the symbol "/" generally indicates an "or" relationship between associated objects.

A liquid level measurement circuit and an apparatus according to embodiments of the present application can be configured to measure a liquid level of a measurement liquid, and especially can prevent an interference from the viscosity of the measurement liquid on a measurement result when applied in measurement of a liquid level of a viscous liquid. For ease of explanation, in the embodiments of the present application, an example in which the above liquid level measurement circuit and apparatus are used to measure a liquid level of the photosensitive resin in a three-dimensional (3D) printer is taken for explanation.

In the related art, the liquid level measurement of the photosensitive resin in the light curing 3D printer is mostly performed by: a buoy plus a photoelectric switch/microswitch, in which the buoy rises or falls with the liquid level of the photosensitive resin under the buoyancy of the photosensitive resin, and an action of the photoelectric switch/microswitch is triggered when the buoy falls to a certain level, whereby it is determined that the liquid level of the photosensitive resin is too low.

However, due to the viscosity of the photosensitive resin, when the buoy moves up and down in the liquid accommodation body 31 accommodating the photosensitive resin, the buoy may be affected by the viscosity of the photosensitive resin, and the buoy may be stuck to a side wall of the liquid accommodation body 31, which makes a liquid level measurement result inaccurate, and as a result, a too low liquid level of the photosensitive resin in the 3D printer cannot be found in time.

When the liquid level measurement circuit and the liquid level measurement apparatus according to the embodiments of the present application are applied in measurement of the liquid level of the photosensitive resin in the 3D printer, a probe is prevented from being stuck to the side wall of the liquid accommodation body due to the viscosity of the photosensitive resin. Even if the photosensitive resin is stuck to a surface of the probe 1, since a positive electrode conductor and a negative electrode conductor are arranged spaced apart from each other, the positive electrode conductor and the negative electrode conductor are not connected to each other when at least one of the positive electrode conductor and the negative electrode conductor is not immersed in the photosensitive resin, and thus an electrical signal on the negative electrode conductor can be distinguished from an electrical signal when the probe 1 is immersed in the photosensitive resin, so as to improve the reliability of liquid level measurement of the photosensitive resin. In this way, when the liquid level of the photosensitive resin gradually decreases during 3D printing, a too low liquid level of the photosensitive resin can be found in time, thus avoiding printing errors caused by the too low liquid level of the photosensitive resin.

The liquid level measurement circuit and the liquid level measurement apparatus according to the embodiments of the present application will be described in detail below with reference to the accompanying drawings by way of specific embodiments and application scenarios thereof. Further, the following embodiments and features in the embodiments may be combined with each other without conflicts.

Figure 2:
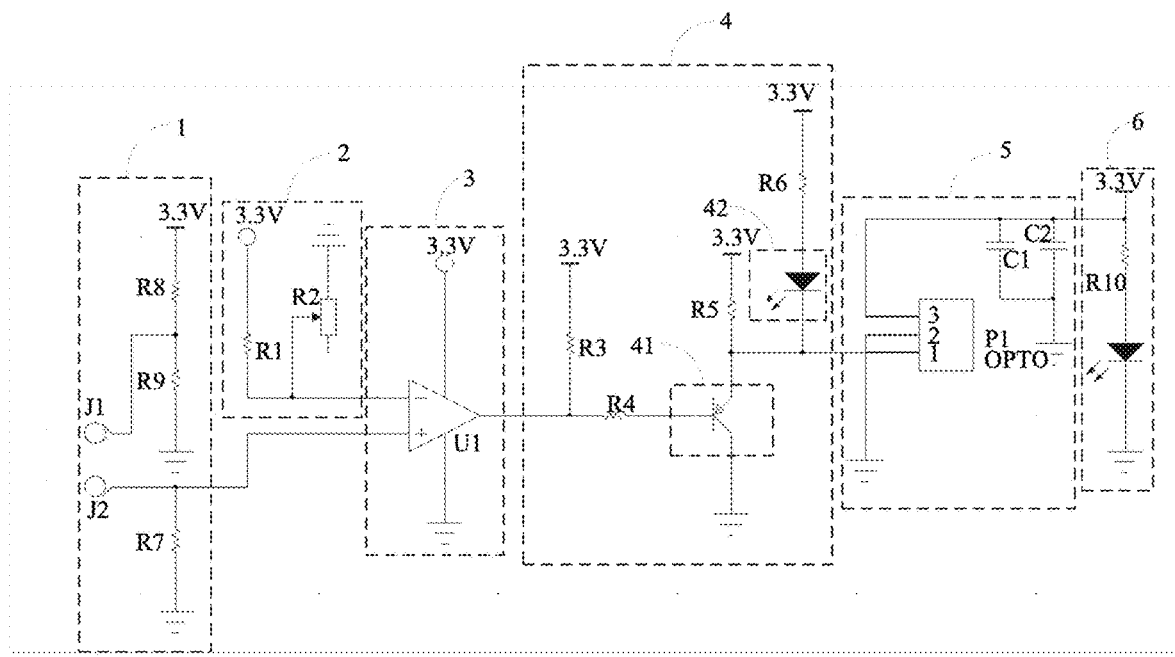
FIG. 2 is a schematic diagram of a specific circuit of the liquid level measurement circuit according to an embodiment of the present application.

Referring to FIGS. 1 and 2, FIG. 1 is a structural diagram of a liquid level measurement circuit 100 according to an embodiment of the present application; and FIG. 2 is a circuit diagram of a liquid level measurement circuit according to an embodiment of the present application. The liquid level measurement circuit may be applied in a 3D printer. As shown in FIG. 1, the liquid level measurement circuit 100 includes: a probe 1, a reference electrical signal module 2, and a potential conversion module 3. The probe 1 extends into a liquid accommodation body 31. A measurement liquid is accommodated in the liquid accommodation body 31, and the measurement liquid is electrically conductive. The probe 1 is electrically connected to an external power source, the probe 1 is also electrically connected to the potential conversion module 3, and the potential conversion module 3 is electrically connected to the reference electrical signal module 2. If the liquid level of the measurement liquid is lower than a preset liquid level and a connection is not made inside the probe 1, a voltage at an end of the potential conversion module 3 connected to the probe 1 is less than a voltage at an end of the potential conversion module 3 connected to the reference electrical signal module 2, and the potential conversion module 3 outputs a first electrical signal; and if the liquid level of the measurement liquid is not lower than the preset liquid level, a connection is made inside the probe 1, the voltage at the end of the potential conversion module 3 connected to the probe 1 is larger than the voltage at the end of the potential conversion module 3 connected to the reference electrical signal module 2, and the potential conversion module 3 outputs a second electrical signal. An external apparatus can obtain the first electrical signal and the second electrical signal to determine whether the liquid level of the measurement liquid in the liquid accommodation body 31 is lower than the preset liquid level, such that the external apparatus can perform a subsequent action or function based on the liquid level.

The probe 1 includes a positive electrode conductor J1 and a negative electrode conductor J2 which are arranged spaced apart from each other. The positive electrode conductor J1 is electrically connected to an external power source. The heights of the positive electrode conductor J1 and the negative electrode conductor J2 in the liquid accommodation body 31 may be the same or different. If at least one of the positive electrode conductor J1 and the negative electrode conductor J2 is not immersed in the measurement liquid, the positive electrode conductor J1 and the negative electrode conductor J2 cannot be electrically connected to each other by means of the measurement liquid; and if the positive electrode conductor J1 and the negative electrode conductor J2 are both immersed in the measurement liquid, the positive electrode conductor J1 and the negative electrode conductor J2 may be electrically connected to each other by means of the measurement liquid. The heights of the positive electrode conductor J1 and the negative electrode conductor J2 in the liquid accommodation body 31 may be set as required, so as to adjust the preset liquid level of the measurement liquid in the liquid accommodation body 31.

The potential conversion module 3 includes a first end, a second end, and an output end. The first end of the potential conversion module 3 is electrically connected to the reference electrical signal module 2 such that the first end of the potential conversion module 3 has a reference electrical signal, and the second end of the potential conversion module 3 is electrically connected to the negative electrode conductor J2; and the output end of the potential conversion module 3 is configured to output a signal.

If the liquid level of the measurement liquid is lower than the preset liquid level, at least one of the positive electrode conductor J1 and the negative electrode conductor J2 is not immersed in the measurement liquid, the positive electrode conductor J1 and the negative electrode conductor J2 are electrically insulated from each other, such that an electrical signal at the second end of the potential conversion module 3 has a smaller value than the reference electrical signal, and the output end of the potential conversion module 3 outputs a first electrical signal.

Furthermore, if the liquid level of the measurement liquid is not lower than the preset liquid level, the positive electrode conductor J1 and the negative electrode conductor J2 are immersed in the measurement liquid, the positive electrode conductor J1 is electrically connected to the negative electrode conductor J2 by means of the measurement liquid, such that the electrical signal at the second end of the potential conversion module 3 has a larger value than the reference electrical signal, and the output end of the potential conversion module 3 outputs a second electrical signal.

In a specific implementation, the above first electrical signal and second electrical signal have different electrical signal values, for example, voltages or currents with different values.

In the implementation, the above probe 1 can remain static relative to the liquid accommodation body 31, for example, the positive electrode conductor J1 and the negative electrode conductor J2 of the probe 1 are fixed to the side wall of the liquid accommodation body 31 by a clamping apparatus, and the positive electrode conductor J1 and the negative electrode conductor J2 of the probe 1 extend into the liquid accommodation body 31.

Furthermore, in the embodiments of the present application, the power source electrically connected to the positive electrode conductor J1 may be a power supply chip, a pull-down resistor, or the like, and the voltage provided by the power source may be between 3-12 V (volts). Optionally, the voltage may be specifically 3.3 V.

In an optional implementation, the above probe 1 includes a positive electrode conductor J1 and a negative electrode conductor J2 which are arranged spaced apart from each other, which may be understood that: the probe 1 includes a probe 1 body, and a positive electrode conductor J1 and a negative electrode conductor J2 respectively arranged on a front side and a back side of the probe 1 body. In this implementation, the probe 1 body is not electrically conductive, that is, the probe 1 body is made of an insulating material. The probe 1 body is configured to fix and support at least corresponding one of the positive electrode conductor J1 and the negative electrode conductor J2.

In another optional implementation, the above probe 1 includes a positive electrode conductor J1 and a negative electrode conductor J2 arranged spaced apart from each other, that is, the probe 1 includes two electrically conductive test pins, and the two test pins are arranged spaced apart from each other. The positive electrode conductor J1 acts as one of the test pins, and the negative electrode conductor J2 acts as the other test pin. Specifically, two metal test pins may be directly led out from a circuit board 32 where the liquid level measurement circuit is located, and the two metal test pins may be used as the positive electrode conductor J1 and the negative electrode conductor J2 respectively. It may be understood that in this implementation, the probe 1 body may not be used.

In any one of the above implementations, when any one of the positive electrode conductor J1 and the negative electrode conductor J2 is not immersed in the measurement liquid, the above positive electrode conductor J1 and negative electrode conductor J2 are insulated from each other; when the positive electrode conductor J1 and the negative electrode conductor J2 are both immersed in the measurement liquid, the positive electrode conductor J1 and the negative electrode conductor J2 may be electrically connected to each other based on a certain electrical conductivity of the measurement liquid, and the potential conversion module 3 may obtain an electrical signal through the negative electrode conductor J2.

It should be noted that in practical applications, different measurement liquids have different electrical conductivities. In practical applications, for a measurement liquid with a poor electrical conductivity, the above positive electrode conductor J1 and negative electrode conductor J2 may be respectively arranged on a front side and a back side of the same probe 1 body; and for a measurement liquid with a good electrical conductivity, the above positive electrode conductor J1 and negative electrode conductor J2 may be respectively arranged on different probe 1 bodies. It is only necessary to ensure that when at least one of the positive electrode conductor J1 and the negative electrode conductor J2 is not immersed in the measurement liquid, the value of the electrical signal at the negative electrode conductor J2 is smaller than the value of the reference electrical signal provided by the reference electrical signal module 2, and when the positive electrode conductor J1 and the negative electrode conductor J2 are electrically connected to each other by means of the measurement liquid, the value of the electrical signal obtained by the negative electrode conductor J2 from the positive electrode conductor J1 is larger than the value of the reference electrical signal provided by the reference electrical signal module 2.

In the implementation, the above electrical signal value may be a voltage value, and the above potential conversion module 3 may include an operational amplifier, a comparator, or the like, which is not specifically defined herein.

Furthermore, the above first electrical signal may be larger than the second electrical signal, that is, the potential conversion module 3 can output a high-level signal based on the fact that the value of the electrical signal at the second end is less than the value of the voltage at the first end, and the potential conversion module 3 can output a low-level signal based on the fact that the value of the electrical signal at the second end is larger than the value of the voltage at the first end. For example, as shown in FIG. 2, the potential conversion module 3 includes an operational amplifier U1, the first end of the potential conversion module 3 is a negative end of the operational amplifier U1, the second end of the potential conversion module 3 is a positive end of the operational amplifier U1, and the output end of the potential conversion module 3 is an output end of the operational amplifier U1. In the implementation, the operational amplifier U1 further includes a power supply end connected to a power source, and a reference end connected to a ground end, which will not be described in detail herein.

Of course, in a specific implementation, the value of the above first electrical signal may also be less than the value of the second electrical signal, which is not specifically defined herein.

In an application, when the liquid level measurement circuit provided by the embodiment of the present application outputs a first electrical signal, it may be determined that the liquid level of the measurement liquid in the liquid accommodation body 31 is lower than the preset liquid level, whereby the measurement liquid may be supplemented in the liquid accommodation body 31, prompt information indicative of a too low liquid level may be output, etc., which is not specifically defined herein.

In the embodiment of the present application, when the liquid level of the measurement liquid is high, the probe 1 is inserted into the measurement liquid, such that the negative electrode conductor J2 is electrically connected to the positive electrode conductor J1 by means of the measurement liquid. In this case, the electrical signal at the second end of the potential conversion module 3 has a larger value than the value of the reference electrical signal, and the potential conversion module 3 outputs the second electrical signal. When the liquid level of the measurement liquid drops to cause at least one of the positive electrode conductor J1 and the negative electrode conductor J2 to leave the measurement liquid, the positive electrode conductor and the negative electrode conductor are electrically insulated from each other. In this case, the value of the electrical signal at the second end of the potential conversion module 3 is less than the value of the reference electrical signal, and the potential conversion module 3 outputs the first electrical signal. In this way, it may be determined that the liquid level of the measurement liquid is too low based on the electrical signal output by the potential conversion module 3. Since the probe 1 is used to measure the liquid level in the implementation of the present application, the probe 1 is not stuck like a buoy when the liquid level of a viscous liquid is measured, such that the accuracy of a liquid level measurement result can be improved.

Optionally, as shown in FIG. 2, the reference electrical signal module 2 includes: a first resistor R1 and a second resistor R2. A first end of the first resistor R1 is electrically connected to an external power source, a second end of the first resistor R1 is electrically connected to each of the first end of the potential conversion module 3 and a first end of the second resistor R2, and a second end of the second resistor R2 is grounded.

Optionally, the second resistor R2 is an adjustable resistor, and a resistance value of the second resistor R2 is related to the electrical conductivity of the measurement liquid, such that if the probe 1 is immersed in the measurement liquid, the values of the electrical signals at the first end and the second end of the potential conversion module 3 have a first magnitude relationship, and if the probe 1 is not immersed in the measurement liquid, the values of the electrical signals at the first end and the second end of the potential conversion module 3 have a second magnitude relationship, where the first magnitude relationship is different from the second magnitude relationship.

In an implementation, the first magnitude relationship may be that the value of the electrical signal at the first end of the potential conversion module 3 is larger than the value of the electrical signal at the second end of the potential conversion module 3, and the second magnitude relationship is that the value of the electrical signal at the first end of the potential conversion module 3 is less than the value of the electrical signal at the second end of the potential conversion module 3.

In another implementation, the first magnitude relationship may be that the value of the electrical signal at the first end of the potential conversion module 3 is less than the value of the electrical signal at the second end of the potential conversion module 3, and the second magnitude relationship is that the value of the electrical signal at the first end of the potential conversion module 3 is larger than the value of the electrical signal at the second end of the potential conversion module 3.

In the implementation, considering the fact that different measurement liquids have different electrical conductivities, the value of the electrical signal on the negative electrode conductor may vary when the positive electrode conductor and the negative electrode conductor are connected to each other by means of a different measurement liquid. In the embodiment of the present application, with the arrangement of the first resistor R1 and the second resistor R2 with an adjustable resistance value in the reference electrical signal module 2, it is possible to adjust the value of the reference electrical signal provided by the reference electrical signal module 2 to the first end of the potential conversion module 3 by adjusting the resistance value of the second resistor R2, so as to associate the value of the reference electrical signal with the electrical conductivity of the measurement liquid, that is, the following requirements are met: when the positive electrode conductor J1 and the negative electrode conductor J2 are electrically insulated from each other, the value of the electrical signal at the second end of the potential conversion module 3 is less than the value of the reference electrical signal; and when the positive electrode conductor J1 is electrically connected to the negative electrode conductor J2 by means of the measurement liquid, the electrical signal at the second end of the potential conversion module 3 has a larger value than the reference electrical signal. By adjusting the resistance value of the second resistor R2, the liquid level measurement circuit provided by the embodiment of the present application can be suitable for measuring liquid levels of various measurement liquids with various electrical conductivities.

Optionally, as shown in FIG. 2, the liquid level measurement circuit further includes: a liquid level indicating module 4, where the liquid level indicating module 4 is connected to the output end of the potential conversion module 3. If the liquid level indicating module 4 receives the first electrical signal, prompt information indicative of a low liquid level is output.

In an implementation, the above liquid level indicating module 4 may include a light-emitting diode 42 (LED) light to indicate a low liquid level of the measurement liquid in the liquid accommodation body 31 by controlling the LED light to emit light under the action of the first electrical signal.

Specifically, the liquid level indicating module 4 may include: a transistor 41 and a first light-emitting diode 42. A first end of the transistor 41 is connected to the output end of the potential conversion module 3, a second end of the transistor 41 is connected to each of the external power source and a first end of the light-emitting diode 42, a second end of the light-emitting diode 42 is connected to the external power source, and a third end of the transistor 41 is grounded. If the first end of the transistor 41 receives the first electrical signal, the second end of the transistor 41 is electrically connected to the third end of the transistor 41 to cause the light-emitting diode 42 to emit light; and if the first end of the transistor 41 receives the second electrical signal, the second end of the transistor 41 is electrically disconnected from the third end of the transistor 41 to cause the light-emitting diode 42 not to emit light.

In an implementation, the transistor 41 may be an NPN transistor 41, and the value of the above first electrical signal is less than the value of the second electrical signal. In this way, when the first end of the transistor 41 receives the first electrical signal, the second end and the third end of the NPN transistor 41 may be driven to be electrically connected to each other to cause the first end of the light-emitting diode 42 to be grounded. In this case, the first end of the light-emitting diode 42 is grounded, such that the light-emitting diode 42 is connected to emit light. Furthermore, when the first end of the transistor 41 receives the second electrical signal, the second end and the third end of the transistor 41 may be driven to be electrically disconnected from each other to cause the first end of the light-emitting diode 42 not to be grounded, and the light-emitting diode 42 is not connected and thus does not emit light. When a user sees that the light-emitting diode 42 emits light, the user may determine that the liquid level measurement circuit detect that: the liquid level of the measurement liquid is too low.

It should be noted that in practical applications, the first electrical signal may be an electrical signal having a larger value than the second electrical signal. In this case, the above transistor 41 may be a PNP transistor 41, such that when the first end of the PNP transistor 41 receives the first electrical signal, the second end and the third end of the transistor 41 are electrically connected to each other. When the first end of the transistor 41 receives a low level, the second end and the third end of the PNP transistor 41 are electrically disconnected from each other. This can also cause the light-emitting diode 42 to emit light when the liquid level measurement circuit detects that the liquid level of the measurement liquid is too low, and cause light-emitting diode 42 not to emit light when the liquid level measurement circuit detects that the liquid level of the measurement liquid is not too low, which will not be described in detail herein.

Of course, in a specific implementation, in addition to the above light-emitting diode 42, the above liquid level indicating module 4 may include a loudspeaker, a display screen, etc., so as to indicate a low liquid level of the measurement liquid in the liquid accommodation body 31 by means of sound or displaying related contents.

Optionally, as shown in FIG. 2, the liquid level measurement circuit further includes: a third resistor R3 and a fourth resistor R4. The first end of the transistor 41 is electrically connected to the third end of the potential conversion module 3 by means of the fourth resistor R4, and the first end of the transistor 41 is electrically connected to the external power source by means of the fourth resistor R4 and the third resistor R3. The fourth resistor R4 may limit an excess current between the third end of the potential conversion module 3 and the first end of the transistor 41. Furthermore, with the third resistor R3 and the fourth resistor R4 connected to the power source, when the value of the electrical signal output by the potential conversion module 3 is small, an electrical signal can be supplemented to the first end of the transistor 41, so as to make an electrical signal received by the first end of the transistor 41 is equal to the sum of the electrical signal output by the potential conversion module 3 and the electrical signal provided by the power source through the third resistor R3 and the fourth resistor R4, and thus when the positive electrode conductor J1 is connected to the negative electrode conductor J2 by means of the measurement liquid, the electrical signal received by the first end of the transistor 41 may enable the second end and the third end of the transistor 41 to be connected to each other. When the positive electrode conductor J1 is not connected to the negative electrode conductor J2, the electrical signal received by the first end of the transistor 41 may enable the second end and the third end of the transistor 41 to be disconnected from each other.

Optionally, as shown in FIG. 2, the liquid level measurement circuit further includes: a fifth resistor R5 and a sixth resistor R6, where the fifth resistor R5 is electrically connected between the second end of the transistor 41 and the external power source, and the sixth resistor R6 is electrically connected between the light-emitting diode 42 and the external power source.

In this implementation, the above fifth resistor R5 and sixth resistor R6 are configured to limit a current, so as to avoid direct grounding of the power source when the second end and the third end of the transistor 41 are connected to each other and/or when the light-emitting diode 42 is connected.

Optionally, as shown in FIG. 2, the liquid level measurement circuit further includes: a seventh resistor R7, an eighth resistor R8, and a ninth resistor R9, where the negative electrode conductor J2 is grounded by means of the seventh resistor R7, the positive electrode conductor J1 is electrically connected to the power source by means of the eighth resistor R8, and the positive electrode conductor J1 is grounded by means of the ninth resistor R9.

In this way, when the negative electrode conductor J2 is not connected to the positive electrode conductor J1, the negative electrode conductor J2 is grounded by means of the seventh resistor R7 and thus has a low-level signal; and when the negative electrode conductor J2 is connected to the positive electrode conductor J1, the seventh resistor R7 has a potential, and the negative electrode conductor J2 has a high-level signal.

Furthermore, the eighth resistor R8 and the ninth resistor R9 form a voltage division circuit. By reasonably setting resistance values of the eighth resistor R8 and the ninth resistor R9, the magnitude of the level signal on the positive electrode conductor J1 may be adjusted, thus affecting the magnitude of the level signal on the negative electrode conductor J2 when the negative electrode conductor J2 is connected to the positive electrode conductor J1.

Optionally, as shown in FIG. 2, the liquid level measurement circuit further includes: a signal output module 5, and a power source indication module 6, where a first end of the signal output module 5 and the power source indication module 6 each are electrically connected to the external power source, and a second end of the signal output module 5 is electrically connected to the output end of the electrical signal conversion module 3. The power source indication module 6 sends out indication information for indicating power failure when the power source is out of power, where the signal output module 5 is configured to convert the electrical signal output by the electrical signal conversion module 3 into a corresponding control signal.

In an implementation, the above control signal may be a control signal that can be identified by a machine, such as a control signal for controlling a feeding device to supplement the measurement liquid into the liquid accommodation body 31.

Optionally, as shown in FIG. 2, the above power source indication module 6 may include a second light-emitting diode 42 and a tenth resistor R10, where the second light-emitting diode 42 is electrically connected to an external power source by means of the tenth resistor R10, so as to be always ON when the power source has power, and not to emit light when the power source is out of power.

In an implementation, the second light-emitting diode 42 may have a different color of emitted light than the light-emitting diode 42.

It should be noted that, in practical applications, it is also possible to arrange a liquid level supplement circuit 8 electrically connected to the liquid level measurement circuit, such that the liquid level supplement circuit 8 can realize automatic feeding control of the measurement liquid based on an output signal of the above liquid level measurement circuit. For example, when the liquid level measurement circuit outputs the first electrical signal, the liquid level supplement circuit 8 controls to supplement the measurement liquid based on the first electrical signal Of course, in practical applications, it is also possible to remind a worker to supplement the measurement liquid manually based on the above first electrical signal, which will not be described in detail herein.

Referring to FIGS. 3A to 3D, an embodiment of the present application provides a liquid level measurement apparatus, including a liquid level measurement circuit according to any one of the aforementioned embodiments.

In practical applications, the probe 1 in the liquid level measurement apparatus extends into the liquid accommodation body 31 to detect whether the liquid level of the measurement liquid that is contained in the liquid accommodation body 31 is lower than the preset liquid level.

Optionally, the liquid level measurement apparatus further includes: a vacuum pump 340, a first pipeline 344, and a second pipeline 345. For ease of explanation, the vacuum pump 340 and the first pipeline 344 are simply referred to as a liquid level supplement module 34 in the following embodiments.

The vacuum pump 340 is in communication with an accommodating bottle 346 containing a supplementary liquid through the first pipeline 344, so as to pump air from the accommodating bottle 346 or force air into the accommodating bottle 346. It may be understood that the vacuum pump 340 may specifically include a pump body 343 and a driving motor 342 connected to the pump body 343. The driving motor 342 is configured to drive the pump body 343 to operate. The pump body 343 is in communication with the accommodating bottle 346 containing the supplementary liquid through the first pipeline 344.

A first end of the second pipeline 345 is in communication with the accommodating bottle 346, and a second end of the second pipeline 345 is used to supplement a liquid into the liquid accommodation body 31. Optionally, the first end of the second pipeline 345 extends to a bottom of the accommodating bottle 346, such that the first end of the second pipeline 345 is immersed in the supplementary liquid in the accommodating bottle 346. Specifically, the first end of the second pipeline 345 extends to the bottom of the accommodating bottle 346 through a rigid pipe in the accommodating bottle 346.

The vacuum pump is configured to blow air into the accommodating bottle 346 through the first pipeline 344 if the potential conversion module 3 outputs the first electrical signal, and the pressure of the air in the accommodating bottle 346 will increase, such that the supplementary liquid in the accommodating bottle 346 will enter the liquid accommodation body 31 through the second pipeline 345 under the pressure, thus realizing the function of supplementing the liquid level of the measurement liquid in the liquid accommodation body 31; and if the potential conversion module 3 outputs the second electrical signal, the driving motor 342 of the vacuum pump stops operating.

In this implementation, in the above method of delivering the liquid into the liquid accommodation body 31 by the vacuum pump 340, when it is detected that the liquid level of the measurement liquid in the liquid accommodation body 31 is too low, the measurement liquid can be slowly delivered into the liquid accommodation body 31 in time, such that an impact force on the liquid accommodation body 31 during adding of the measurement liquid can be reduced while it is ensured that the measurement liquid in the liquid accommodation body 31 is sufficient.

Optionally, the liquid level measurement apparatus provided by the embodiment of the present application can be applied in a 3D printing device, and the pump body 343, the driving motor 342 and the liquid level measurement circuit may be connected to a controller 35 in the 3D printing device. The controller 35 can receive the output signal of the liquid level measurement circuit, such that the controller 35 can control the driving motor 342 to operate based on the output signal of the liquid level measurement circuit, so as to control the pump body 343 to operate.

Optionally, the controller 35 may be a main control chip of the 3D printing device. Specifically, the controller 35 may be connected to the output end of the potential conversion module 3, or the controller 35 may be connected to the output end of the potential conversion module 3 by means of a first signal output module 33.

Further, in an implementation, the above controller 35 may be integrated on the same circuit board 32 as the liquid level measurement circuit in the aforementioned embodiment, and the probe 1 in the above liquid level measurement circuit may be connected to the same circuit board 32 by a wire.

Specifically, the controller 35 is connected to the output end of the potential conversion module 3 by means of the first signal output module 33, and the above liquid level measurement circuit outputs the first electrical signal, which may be expressed as follows: the potential conversion module 3 transmits the first electrical signal to the first signal output module 33, and the first signal output module 33 converts the first electrical signal into a corresponding control signal and then transmits the control signal to the controller 35, such that the controller 35 can determine, based on the control signal, that the liquid level measurement circuit outputs the first electrical signal, and determine a liquid level measurement result indicated by the first electrical signal.

The above first signal output module 33 can convert the first electrical signal or the second electrical signal output by the potential conversion module 3 into a control signal that is easy for a machine to understand. Optionally, the control signal may be a digital signal.

In this implementation, with the arrangement of the vacuum pump, the first pipeline 344 and the second pipeline 345 in the liquid level measurement apparatus, when it is detected that the liquid level of the measurement liquid in the liquid accommodation body is too low, the vacuum pump can pressurize the accommodating bottle to automatically supplement the liquid into the liquid accommodation body 31, such that the liquid level of the measurement liquid can be increased, thereby achieving the effect of automatic feeding.

For example, assuming that the liquid level measurement apparatus provided by the embodiment of the present application is applied in a 3D printer, the liquid accommodated in the liquid accommodation body 31 and the accommodating bottle 346 may be 3D printing resin. During 3D printing, in the case of insufficient consumables, the 3D printing resin can be blown into the liquid accommodation body 31 by the liquid level supplement module 34 to realize automatic feeding, which solves the problem that the 3D printing effect is likely to be affected by feeding impact during manual supplementing of the 3D printing resin into the liquid accommodation body 31.

Further, a solenoid valve group 341 is provided in the first pipeline 344, and the solenoid valve group 341 is configured to change an air flow direction in the second pipeline 345 when operating.

It may be understood that the air flow direction in the second pipeline 345 may be a first direction from the accommodating bottle 346 to the liquid accommodation body 31, or a second direction from the liquid accommodation body 31 to the accommodating bottle 346.

In a specific implementation, the air flow direction in the second pipeline 345 is adjusted by adjusting a valve state of the solenoid valve group 341.

When the solenoid valve group 341 adjusts the air flow direction in the second pipeline 345 to the above first direction, the vacuum pump blows air into the accommodating bottle 346 to increase the pressure in the accommodating bottle 346, such that the supplementary liquid in the accommodating bottle 346 is forced out into the liquid accommodation body 31 through the second pipeline 345.

Further, when the solenoid valve group 341 adjusts the air flow direction in the second pipeline 345 to the above second direction, the vacuum pump pumps air from the accommodating bottle 346 to reduce the pressure in the accommodating bottle 346, such that the liquid in the second pipeline 345 can be sucked into the accommodating bottle 346, and there may be no remains of the supplementary liquid in the second pipeline 345, thereby preventing the liquid in the second pipeline 345 from continuously dripping under the action of gravity, and preventing the liquid level in the liquid accommodation body 31 from being too high due to the dripping of the liquid.

It may be understood that when the liquid level measurement apparatus provided by the embodiment of the present application is applied in a 3D printing device, the above solenoid valve group 341 may also be connected to the controller 35 in the 3D printing device to adjust the air flow direction in the second pipeline 345 under the control of the controller 35.

For example, when the liquid level measurement circuit outputs the second electrical signal, the controller 35 in the 3D printing device may first generate a first control signal based on the second electrical signal and generate a second control signal after a preset time; the solenoid valve group 341 adjusts the air flow direction in the second pipeline 345 to the second direction in response to the first control signal, the second direction is a direction from the accommodating bottle 346 to the pump body 343, and the driving motor 342 drives the pump body 343 to operate in response to the first control signal; and the driving motor 342 further stops driving the pump body 343 to operate in response to the second control signal.

In this implementation, after the air flow direction in the second pipeline 345 is adjusted to the above second direction by the solenoid valve group 341 for a preset time, the controller 35 can control the driving motor 342 and the pump body 343 to stop operating. Since the liquid in the second pipeline 345 is sucked back into the accommodating bottle 346, the liquid may not drip from an outlet of the second pipeline 345.

The preset time may be 20 seconds. Of course, in practical applications, the above preset time may be related to the length of the second pipeline 345, the air flow output by the vacuum pump, etc., and the preset time can ensure that all the liquid in the second pipeline 345 can be sucked back into the accommodating bottle 346, which is not specifically defined herein.

Of course, in practical applications, it is also possible to directly control the driving motor 342 and the pump body 343 to stop operating when the controller 35 obtains the second electrical signal output by the potential conversion module 3, which is not described in detail herein.

Figure 3A:
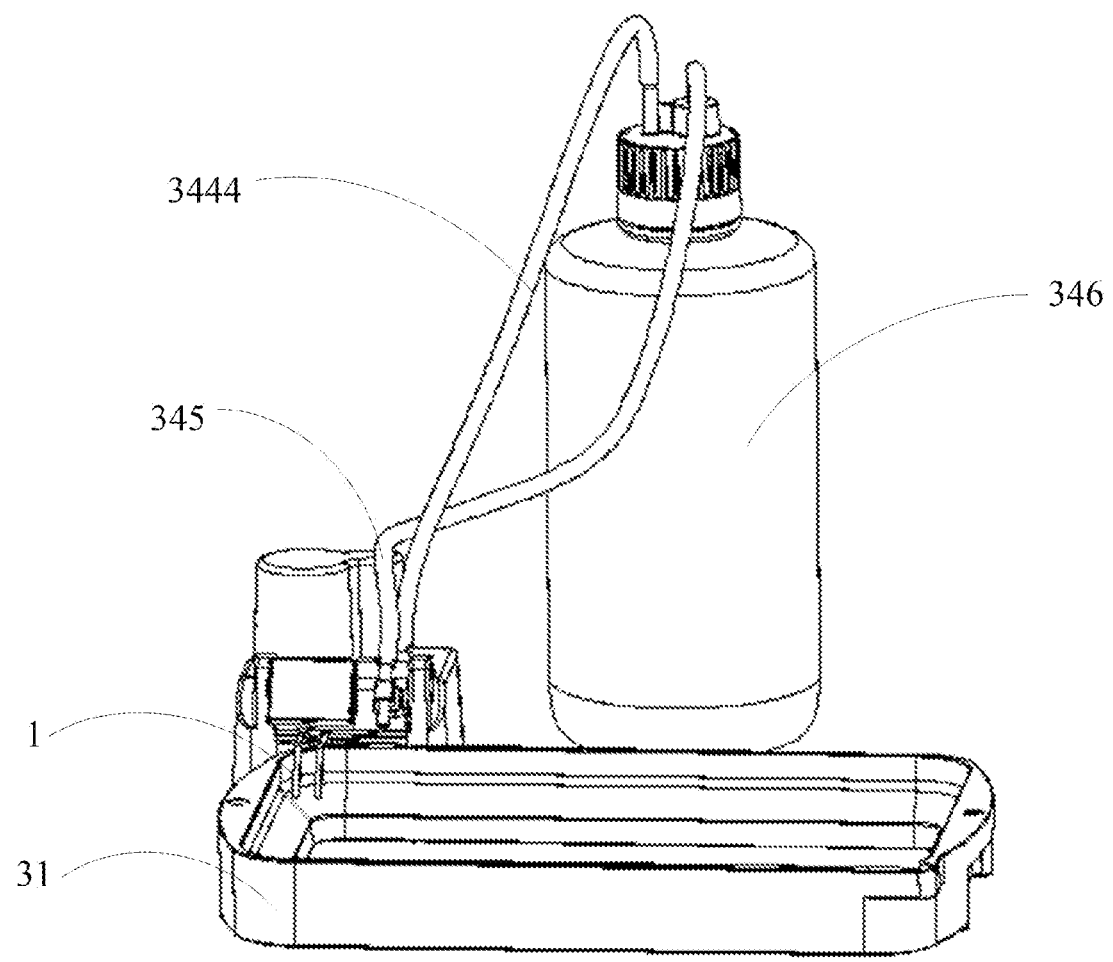
FIG. 3A is a schematic structural diagram of a liquid level measurement apparatus according to an embodiment of the present application.
Figure 3B:
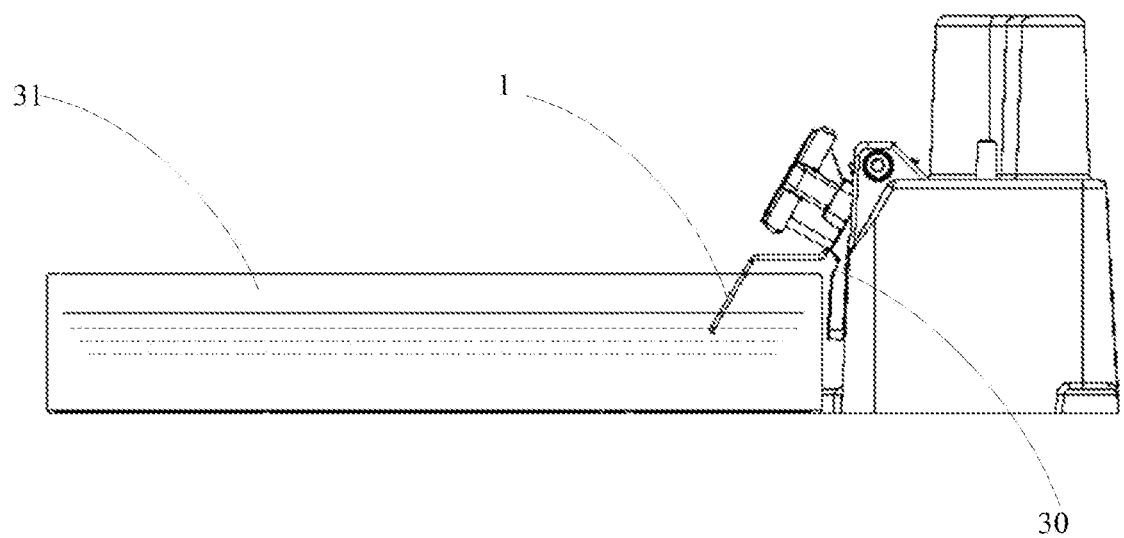
FIG. 3B is a perspective schematic diagram of a liquid level measurement apparatus according to an embodiment of the present application.
Figure 3C:
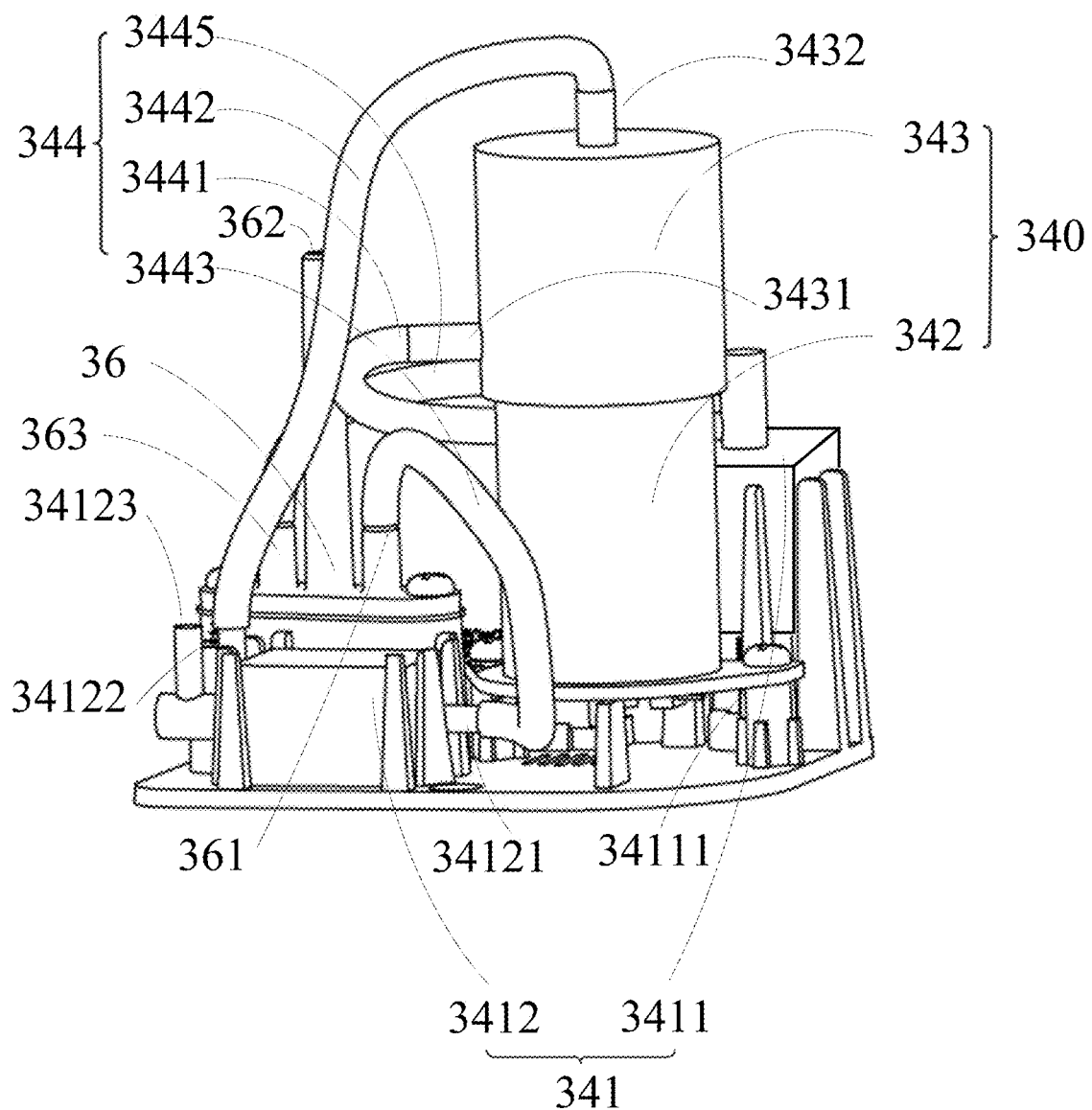
FIG. 3C is a schematic front view of a liquid level measurement apparatus according to an embodiment of the present application.
Figure 3D:
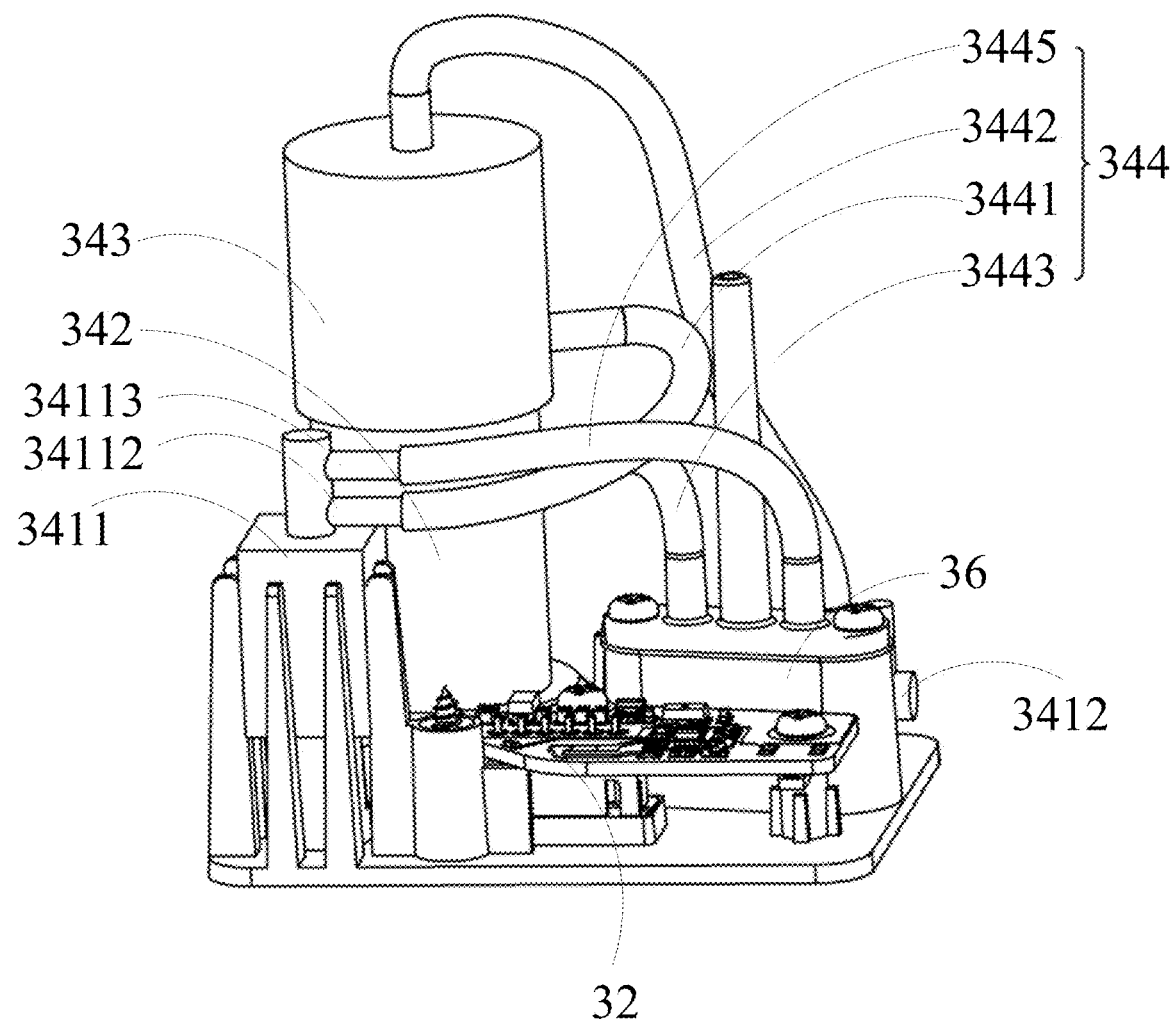
FIG. 3D is a schematic rear view of a liquid level measurement apparatus according to an embodiment of the present application.

In a specific implementation, as shown in FIGS. 3C and 3D, the solenoid valve group 341 includes a first solenoid valve 3411 and a second solenoid valve 3412, and each solenoid valve includes a first port, a second port, and a third port. The first port and the second port of the solenoid valve are connected to each other when the solenoid valve is closed, and the second port and the third port of the solenoid valve are connected to each other when the solenoid valve is opened.

The first port and the second port of the solenoid valve are connected to each other when the solenoid valve is closed, which may be understood as that: when the first solenoid valve 3411 is closed, the first port 34111 of the first solenoid valve 3411 is in communication with the second port 34112 of the first solenoid valve 3411, and the third port 34113 of the first solenoid valve 3411 is not in communication with the first port 34111 and the second port 34112 of the first solenoid valve 3411; and similarly, when the second solenoid valve 3412 is closed, the first port 34121 of the second solenoid valve 3412 is in communication with the second port 34122 of the second solenoid valve 3412, and the third port 34123 of the second solenoid valve 3412 is not in communication with the first port 34121 and the second port 34122 of the second solenoid valve 3412.

Accordingly, the second port and the third port of the solenoid valve are connected to each other when the solenoid valve is opened, which may be understood as that: when the first solenoid valve 3411 is opened, the second port 34112 of the first solenoid valve 3411 is connected to the third port 34113 of the first solenoid valve 3411, and the first port 34111 of the first solenoid valve 3411 is not in communication with the second port 34112 and the third port 34113 of the first solenoid valve 3411; and similarly, when the second solenoid valve 3412 is opened, the second port 34122 of the second solenoid valve 3412 is in communication with the third port 34123 of the second solenoid valve 3412, and the first port 34121 of the second solenoid valve 3412 is not in communication with the second port 34122 and the third port 34123 of the second solenoid valve 3412.

The liquid level measurement apparatus further includes a tee joint 36. The tee joint 36 includes a first tee joint port 361, a second tee joint port 362, and a third tee joint port 363. The first tee joint port 361, the second tee joint port 362 and the third tee joint port 363 of the tee joint 36 are in communication with each other.

The first pipeline 344 includes a first pipe 3441, a second pipe 3442, a third pipe 3443, a fourth pipe 3444, and a fifth pipe 3445. The second port 34112 of the first solenoid valve 3411 is in communication with an air inlet end 3431 of the vacuum pump through the first pipe 3441, an air outlet end 3432 of the vacuum pump is in communication with the second port 34122 of the second solenoid valve 3412 through the second pipe 3442, the first port 34121 of the second solenoid valve 3412 is connected to the first tee joint port 361 of the tee joint 36 through the third pipe 3443, the second tee joint port 362 of the tee joint 36 is in communication with the accommodating bottle 346 through the fourth pipe 3444, and the third tee joint port 363 of the tee joint 36 is in communication with the third port 34113 of the first solenoid valve 3411 through the fifth pipe 3445.

The second tee joint port 362 of the tee joint 36 is in communication with the accommodating bottle 346 through the fourth pipe 3444, and air can be blown into or sucked from the accommodating bottle 346 through the second tee joint port 362 of the tee joint 36.

In practical applications, the solenoid valve group 341, the driving motor 342 and the pump body 343 each have a first operating state and a second operating state.

In the first operating state, the first solenoid valve 3411 and the second solenoid valve 3412 are both closed; and in the second operating state, the first solenoid valve 3411 and the second solenoid valve 3412 are both opened.

If the potential conversion module 3 outputs the first electrical signal, the controller 35 controls the solenoid valve group 341 to operate in the above first operating state.

In this case, air sequentially passes through the first port 34111 of the first solenoid valve 3411, the second port 34112 of the first solenoid valve 3411, the first pipe 3441, an air inlet end 3431 of the pump body 343, an air outlet end 3432 of the pump body 343, the second pipe 3442, the second port of the second solenoid valve 3412, the first port 34121 of the second solenoid valve 3412, the third pipe 3443, the first tee joint port 361 of the tee joint 36, the second tee joint port 362 of the tee joint 36, and the fourth pipe 3444 to enter the accommodating bottle 346, such that air is blown into the accommodating bottle 346 through the first pipeline 344 to increase the pressure in the accommodating bottle 346, and thus the supplementary liquid in the accommodating bottle 346 is forced into the second pipeline 345 to flow into the liquid accommodation body 31 through a supplementary port, thereby realizing the function of automatic feeding.

Furthermore, if the potential conversion module 3 outputs the second electrical signal, the controller 35 controls the solenoid valve group 341 to operate in the second operating state.

In this case, air sequentially passes through the accommodating bottle 346, the fourth pipe 3444, the second tee joint port 362 of the tee joint 36, the third tee joint port 363 of the tee joint 36, the fifth pipe 3445, the third port 34113 of the first solenoid valve 3411, the second port 34112 of the first solenoid valve 3411, the first pipe 3441, the air inlet end of the pump body 343, the air outlet end 3432 of the pump body 343, the second pipe 3442, the second port 34122 of the second solenoid valve 3412 and the third port 34123 of the second solenoid valve 3412. The air finally exits the third port 34123 of the second solenoid valve 3412, such that air is pumped from the accommodating bottle 346 to reduce the pressure in the accommodating bottle 346, thereby sucking the supplementary liquid in the second pipeline 345 into the accommodating bottle 346, so as to prevent residual supplementary liquid from remaining in the second pipeline 345.

It should be noted that the controller 35 may control the driving motor 342 and the pump body 343 to stop operating after controlling the solenoid valve group 341 to operate in the above second operating state for the preset time, so as to stop feeding.

In other words, in practical operations, a complete feeding process may include the following three stages.

In a first stage, the liquid level measurement apparatus detects that the liquid level of the measurement liquid in the liquid accommodation body 31 is lower than the preset liquid level, and in this case, the controller 35 controls the driving motor 342 to drive the pump body 343 to operate, and controls the solenoid valve group 341 to operate in the above first operating state.

In a second stage, the liquid level measurement apparatus detects that the liquid level of the measurement liquid in the liquid accommodation body 31 rises to the preset liquid level, and in this case, the controller 35 controls the driving motor 342 to drive the pump body 343 to operate, and controls the solenoid valve group 341 to operate in the above second operating state.

In a third stage, after the solenoid valve group 341 operates in the above second operating state for the preset time (for example, 20 seconds), the controller 35 controls the driving motor 342 and the pump body 343 to stop operating. It may be understood that as an option, after the solenoid valve group 341 operates in the above second operating state for the preset time, the controller 35 controls the driving motor 342 and the pump body 343 to stop operating, and may also control the solenoid valve group 341 to operate in the above first operating state.

Optionally, the liquid level measurement apparatus further includes: a clamping and fixing structure 30, where the probe 1 in the liquid level measurement circuit is fixed to the clamping and fixing structure 30. Optionally, the probe body of the probe 1 is fixed to the clamping and fixing structure 30. The clamping and fixing structure 30 may have a relaxed state and a clamping state.

Figure 3E:
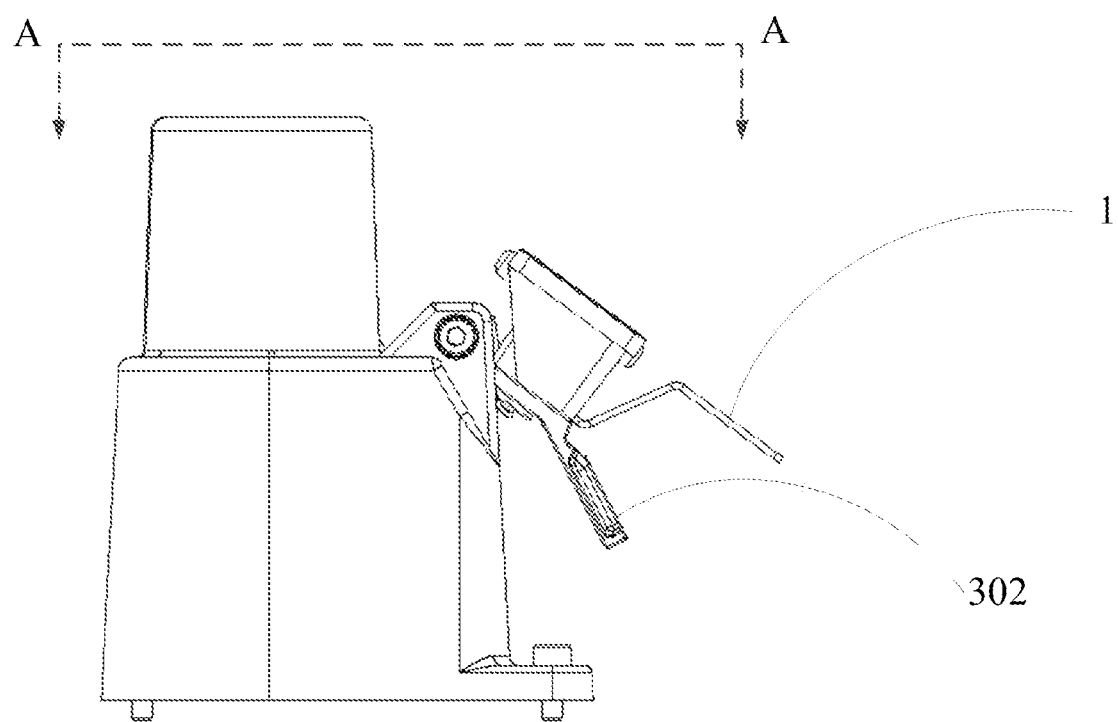
FIG. 3E is a schematic structural diagram of a clamping and fixing apparatus of the liquid level measurement apparatus in a relaxed state according to an embodiment of the present application.
Figure 3F:
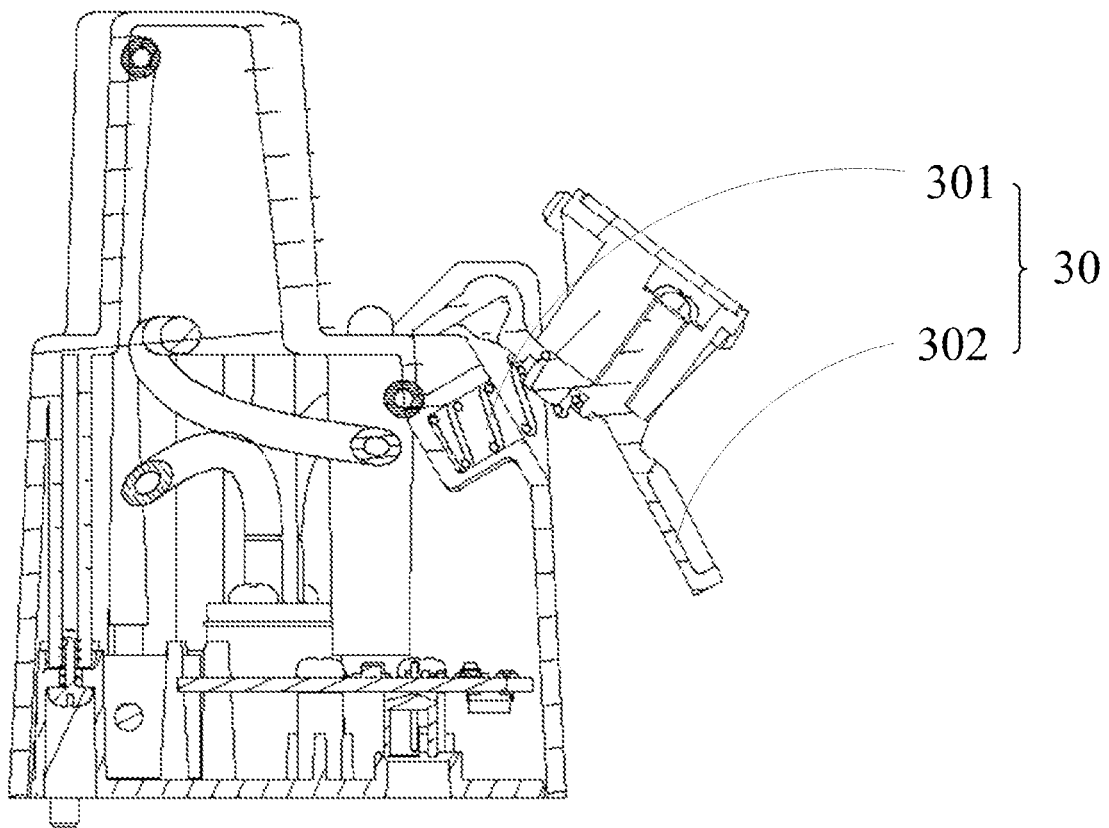
FIG. 3F is a schematic cross-sectional view taken along line A-A of FIG. 3E.

As shown in FIGS. 3E and 3F, in the relaxed state, at least one of a positive electrode conductor J1 and a negative electrode conductor J2 in the liquid level measurement circuit is not in contact with the measurement liquid in the liquid accommodation body 31; and in the clamping state, if the measurement liquid in the liquid accommodation body 31 is higher than a preset liquid level, the positive electrode conductor J1 and the negative electrode conductor J2 in the liquid level measurement circuit are both in contact with the measurement liquid.

In an implementation, the probe 1 body in which at least one of the above positive electrode conductor J1 and negative electrode conductor J2 is located may be fixed to the clamping and fixing structure 30 by means of a connecting structure, such as a screw, to follow the clamping and fixing structure 30.

Specifically, when the liquid accommodation body 31 needs to be removed, the clamping and fixing structure 30 may be adjusted into the relaxed state as shown in FIGS. 3E and 3F, so as to move the probe 1 body away from the liquid accommodation body 31, thereby facilitating removal and placement of the liquid accommodation body 31.

Furthermore, the clamping and fixing structure 30 may be provided with an adjusting arm 302, and the adjusting arm 302 is configured to adjust the state of the clamping and fixing structure 30. The adjusting arm 302 is configured to abut against an outer side wall of the liquid accommodation body 31. In this way, when the clamping and fixing structure 30 is in the relaxed state and the liquid accommodation body 31 needs to be assembled, the clamping and fixing structure 30 can be adjusted to the clamping state by simply causing the outer side wall of the liquid accommodation body 31 to abut against the adjusting arm 302 and pressing the adjusting arm 302 in a direction close to a center of the clamping and fixing structure 30, so as to enable the relative positions of the probe 1 and the liquid accommodation body 31 to meet the requirements of the above liquid level measurement circuit, and to keep the depth of probe 1 extending into the liquid accommodation body 31 constant.

In an implementation, a spring 301 is further provided on a side of the above adjusting arm 302 facing away from the liquid accommodation body 31, which may reduce an operating force provided by a user during adjustment of the clamping and fixing structure 30 from the clamping state to the relaxed state.

It should be noted that, as shown in FIGS. 3B to 3D, the liquid level measurement apparatus provided by the embodiment of the present application further includes a housing. The above pump body 343, the driving motor 342, the solenoid valve group 341, and the circuit board 32 including the liquid level measurement circuit as shown in FIG. 1 or 2 are all accommodated inside an accommodating cavity of the housing. In this case, the above fixing and clamping means 30 may be composed of components on the housing. That is to say, the above housing is detachably connected to the liquid accommodation body 31.

Further, in order to facilitate the detachment of the housing from the liquid accommodation body 31, there is an included angle A between the probe 1 body and a horizontal plane, and the included angle fits with a side wall structure of the liquid accommodation body 31, so as to facilitate convenient removal and placement of the liquid accommodation body 31 between the probe 1 body and the housing.

In an optional implementation, one of the positive electrode conductor J1 and the negative electrode conductor J2 is attached to a front side of the probe 1 body, the other of the positive electrode conductor J1 and the negative electrode conductor J2 is attached to a back side of the probe 1 body, and there is an included angle A between the probe 1 body and the horizontal plane, where $0°<A<90°$.

In an implementation, as shown in FIG. 3D, the circuit board 32 in which the liquid level measurement circuit is located is fixed to the side wall of the liquid accommodation body 31 by the fixing and clamping means 30, and in this case, the probe 1 body may be an extension of the circuit board 32, that is, the probe 1 body is of a plate-like structure. In this case, there is an included angle A between the probe 1 body and the horizontal plane, which may be understood as that: there is an included angle A between a plane in which the probe 1 body is located and the horizontal plane, and the positive electrode conductor J1 and the negative electrode conductor J2 are distributed on the opposite sides of the probe 1 body. In this implementation, there is an included angle A between the probe 1 body and the horizontal plane to tilt the probe 1 body toward a center of the liquid accommodation body 31, and a distance between the probe 1 body and the side wall of the liquid accommodation body 31 can be increased. In this way, when the measurement liquid that is accommodated in the liquid accommodation body 31 is a viscous liquid, the problem can be solved that when the liquid level of the viscous liquid is lower than the preset liquid level, a too small distance between the probe 1 body and the side wall of the liquid accommodation body 31 causes part of the viscous liquid to still adhere between the probe 1 body and the side wall of the liquid accommodation body 31 and thus results in an inaccurate liquid level measurement result due to that the positive electrode conductor J1 and the negative electrode conductor J2 arranged on the probe 1 body are connected to each other by means of the measurement liquid even if the liquid level of the measurement liquid is relatively low.

Optionally, the included angle A is 45°.

It may be understood that the lengths of the positive electrode conductor J1 and the negative electrode conductor J2 may be reasonably set, such that one end of the positive electrode conductor J1 close to the bottom of the liquid accommodation body 31 and one end of the negative electrode conductor J2 close to the bottom of the liquid accommodation body 31 are located on the same horizontal plane, and thus the accuracy of liquid level measurement may be improved.

Figure 4:
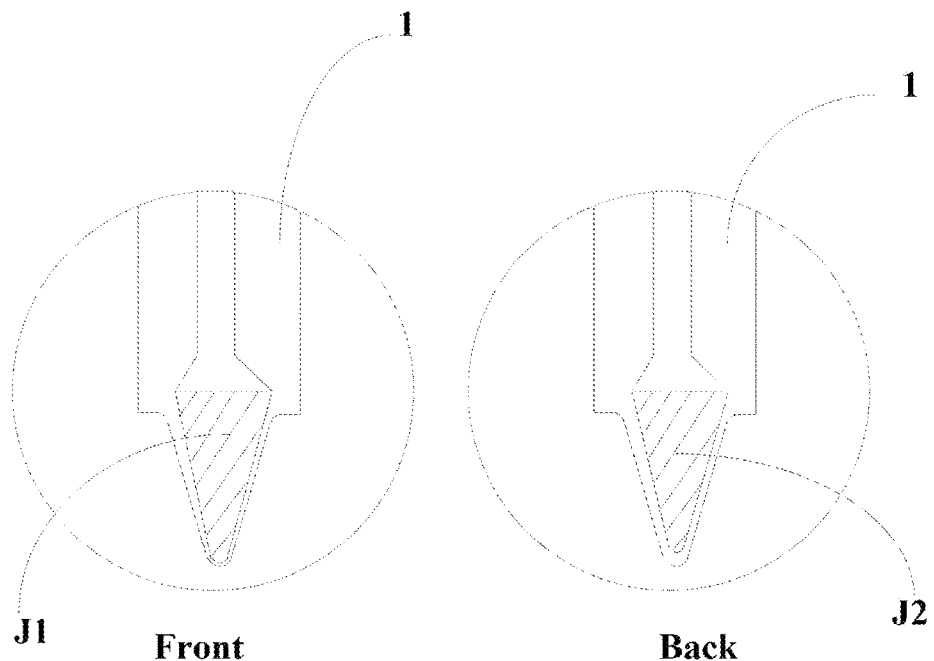
FIG. 4 is a schematic diagram of a front side and a back side of a probe of the liquid level measurement apparatus according to an embodiment of the present application.
Figure 5:
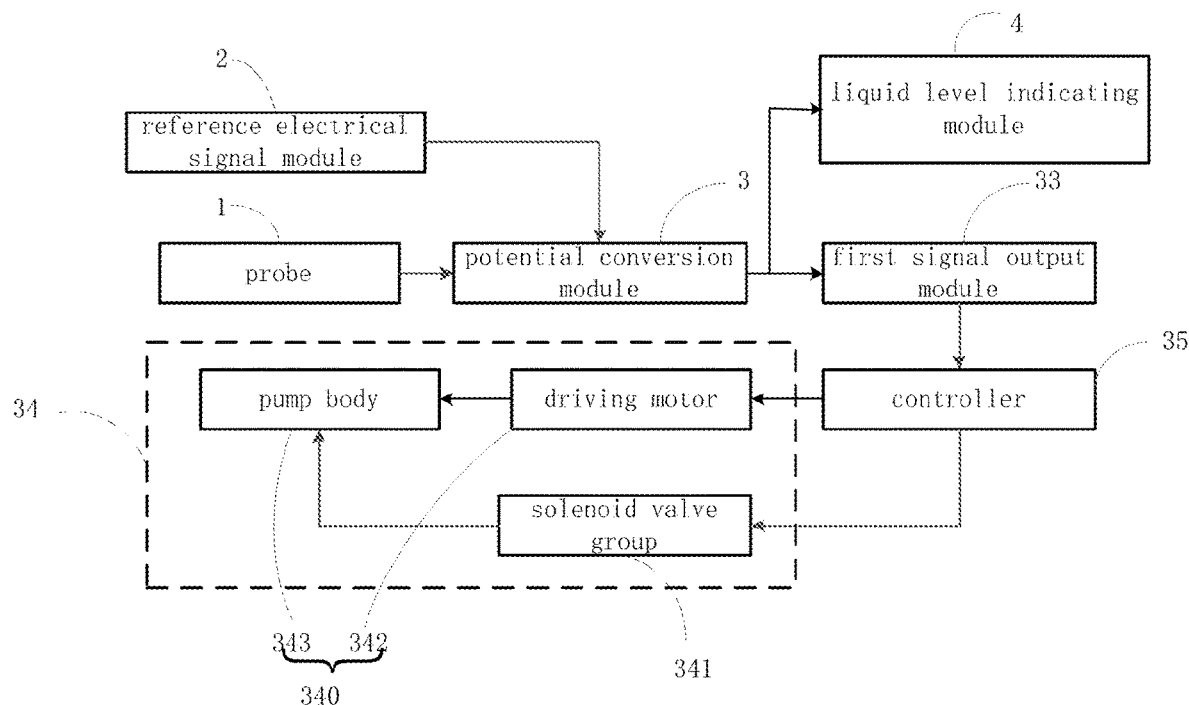
FIG. 5 is a schematic structural diagram of another liquid level measurement circuit according to an embodiment of the present application.

Optionally, one of the positive electrode conductor J1 and the negative electrode conductor J2 is attached to a front side of the probe 1 body, the other of the positive electrode conductor J1 and the negative electrode conductor J2 is attached to a back side of the probe 1 body, and the conductor on the back side is shorter than the conductor on the front side. For example, as shown in FIG. 4, the probe 1 body is of a sheet structure, the positive electrode conductor J1 is attached to the front side of the probe 1 body, the negative electrode conductor J2 is attached to the back side of the probe 1 body, and the negative electrode conductor J2 may be 1 mm shorter than the positive electrode conductor J1, that is, a second distance between the negative electrode conductor J2 and a top end of the probe 1 body is smaller than a first distance between the positive electrode conductor J1 and the top end of the probe 1 body.

In another optional implementation, the above positive electrode conductor J1 and negative electrode conductor J2 may be test pins each extending from the circuit board 32 in which the liquid level measurement circuit is located. In this case, again, the positive electrode conductor J1 and the negative electrode conductor J2 are brought into contact with the measurement liquid simultaneously or leave the measurement liquid simultaneously when the liquid level of the measurement liquid changes by simply adjusting extension angles or lengths of the two test pins such that ends of the two test pins close to the bottom of the liquid accommodation body 31 are in the same horizontal line.

Optionally, materials of the positive electrode conductor J1 and the negative electrode conductor J2 include an anti-oxidation material. The positive electrode conductor J1 and the negative electrode conductor J2, which are made of the anti-oxidation material, provide a better effect with respect to measuring the liquid level of the viscous measurement liquid.

Figure 6:
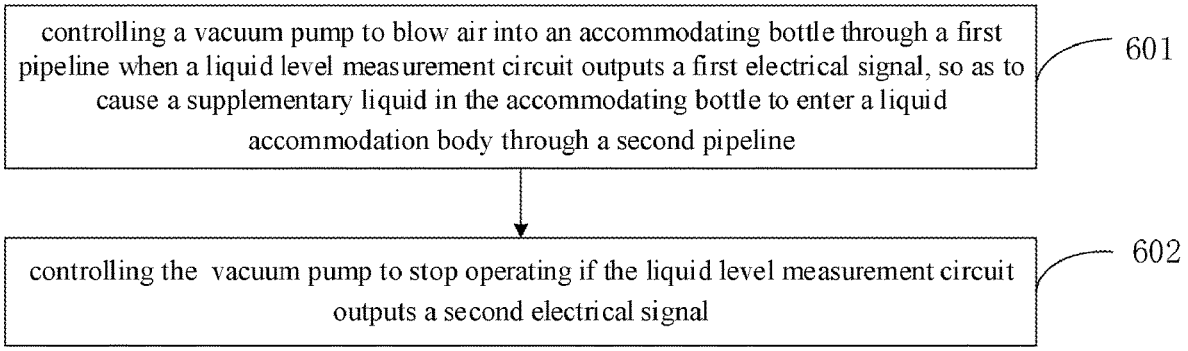
FIG. 6 is a schematic flowchart of a liquid level measurement method according to an embodiment of the present application.

FIG. 6 is a flowchart of a liquid level measurement method according to an embodiment of the present application. The liquid level measurement method can be applied in a 3D printing device, that is to say, it may a controller 35 in the 3D printing device that carries out the liquid level measurement method, and the 3D printing device includes a liquid level measurement apparatus as shown in FIGS. 3A to 5. The liquid level measurement method may include the following steps.

In step 601, a vacuum pump is controlled to blow air into an accommodating bottle through a first pipeline 344 if a liquid level measurement circuit outputs a first electrical signal, so as to cause a supplementary liquid in the accommodating bottle to enter a liquid accommodation body 31 through a second pipeline 345.

In step 602, the vacuum pump is controlled to stop operating if the liquid level measurement circuit outputs a second electrical signal.

Optionally, the above step 602 includes:
generating, if the liquid level measurement circuit outputs the second electrical signal, a first control signal based on the second electrical signal, and generating a second control signal after a preset time;
adjusting a valve state of a solenoid valve group 341 based on the first control signal to adjust an air flow direction in the second pipeline 345 to a second direction, the second direction being a direction from the liquid accommodation body 31 to the accommodating bottle, such that the supplementary liquid in the second pipeline 345 enters the accommodating bottle under a pressure; and
controlling the vacuum pump and the solenoid valve group 341 to stop operating based on the second control signal.

The steps of the liquid level measurement method provided by the embodiment of the present application correspond to the processes carried out by the controller 35 in the liquid level measurement apparatus as shown in FIGS. 3A to 5, and automatic feeding can be realized when the liquid level of the 3D printing resin contained in the liquid accommodation body 31 is too low in the steps, thereby preventing the problem that the 3D printing effect is likely to be affected by a feeding impact during manual adding of the 3D printing resin, which will not be described in detail herein.

Although the embodiments of the present application are described above with reference to the figures, the present application is not limited to the specific implementations described above, and the above specific implementations are merely illustrative and not restrictive. Numerous forms may also be made by those of ordinary skill in the art under the inspiration of the present application without departing from the spirit of the present application and the scope of protection of the claims, and these forms all fall within the scope of protection of the present application.

What is claimed is:

1. A liquid level measurement method for application in a 3D printing device, the 3D printing device comprising a liquid level measurement apparatus comprising a liquid level measurement circuit, the liquid level measurement circuit comprising a probe, a reference electrical signal module, and a potential conversion module, wherein the probe extends into a liquid accommodation body, and a measurement liquid is accommodated in the liquid accommodation body;

the probe comprises a positive electrode conductor and a negative electrode conductor which are arranged spaced apart from each other, the positive electrode conductor is electrically connected to an external power source, and an end of the positive electrode conductor close to a bottom of the liquid accommodation body and an end of the negative electrode conductor close to the bottom of the liquid accommodation body are located on the same horizontal plane; and the potential conversion module comprises a first end, a second end, and an output end, wherein the first end of the potential conversion module is electrically connected to the reference electrical signal module such that the first end of the potential conversion module has a reference electrical signal, and the second end of the potential conversion module is electrically connected to the negative electrode conductor;

wherein if the liquid level of the measurement liquid is lower than a preset liquid level, at least one of the positive electrode conductor and the negative electrode conductor is not immersed in the measurement liquid, the positive electrode conductor and the negative electrode conductor are electrically insulated from each other, such that an electrical signal at the second end of the potential conversion module has a smaller value than the reference electrical signal, and the output end of the potential conversion module outputs a first electrical signal; and if the liquid level of the measurement liquid is not lower than the preset liquid level, the positive electrode conductor and the negative electrode conductor are immersed in the measurement liquid, the positive electrode conductor is electrically connected to the negative electrode conductor by means of the measurement liquid, such that the electrical signal at the second end of the potential conversion module has a greater value than the reference electrical signal, and the output end of the potential conversion module outputs a second electrical signal wherein the method comprises:
controlling a vacuum pump to blow an air into an accommodating bottle through a first pipeline if the liquid level measurement circuit outputs the first electrical signal, so as to cause a supplementary liquid in the accommodating bottle to enter the liquid accommodation body through a second pipeline; and
controlling the vacuum pump to stop operating if the liquid level measurement circuit outputs the second electrical signal,
wherein controlling the vacuum pump to stop operating if the liquid level measurement circuit outputs a second electrical signal comprises:
generating, if the liquid level measurement circuit outputs the second electrical signal, a first control signal based on the second electrical signal, and generating a second control signal after a preset time;
adjusting a valve state of a solenoid valve group based on the first control signal to adjust an air flow direction in the second pipeline such that the supplementary liquid in the second pipeline enters the accommodating bottle under a pressure; and
controlling the vacuum pump and the solenoid valve group to stop operating based on the second control signal.

2. The liquid level measurement method of claim 1, wherein the 3D printing device comprises
a liquid level supplement circuit, configured to supplement the measurement liquid based on the first electrical signal, wherein the measurement liquid is a resin for a 3D printing device.

3. The liquid level measurement method of claim 1, wherein the liquid measurement circuit further comprises a liquid level indicating module, wherein the liquid level indicating module being electrically connected to the output end of the potential conversion module; and if the liquid level indicating module receives the first electrical signal, prompt information indicative of a low liquid level is output.

4. The liquid level measurement method of claim 3, wherein the liquid level indicating module comprises a transistor and a light-emitting diode, wherein
a first end of the transistor is electrically connected to the output end of the potential conversion module, a second end of the transistor is electrically connected to a power source and a first end of the light-emitting diode, a second end of the light-emitting diode is electrically connected to a power source, and a third end of the transistor is grounded;
if the first end of the transistor receives the first electrical signal, the second end of the transistor is connected to the third end of the transistor to cause the light-emitting diode to emit light; and
if the first end of the transistor receives the second electrical signal, the second end of the transistor is disconnected from the third end of the transistor to cause the light-emitting diode not to emit light.

5. The liquid level measurement method of claim 1,
wherein the reference electrical signal module comprises a first resistor and a second resistor, wherein the second resistor is an adjustable resistor such that a resistance of the second resistor is adjustable in the reference electrical signal module, and a resistance value of the second resistor is related to electrical conductivity of the measurement liquid, such that if the probe is immersed in the measurement liquid, the values of the electrical signals at the first end and the second end of the potential conversion module have a first magnitude relationship, and if the probe is not immersed in the measurement liquid, the values of the electrical signals at the first end and the second end of the potential conversion module have a second magnitude relationship, the first magnitude relationship being different from the second magnitude relationship,
wherein a first end of the first resistor is electrically connected to a power source, a second end of the first resistor is electrically connected to the first end of the potential conversion module and a first end of the second resistor, and a second end of the second resistor is grounded.

6. The liquid level measurement method of claim 1, wherein the liquid level measurement apparatus further comprises the vacuum pump, the first pipeline, and the second pipeline, wherein
a first end of the second pipeline is in communication with the accommodating bottle, and a second end of the second pipeline is used to provide the supplementary liquid into the liquid accommodation body.

7. The liquid level measurement method of claim 6, wherein the solenoid valve group is provided in the first pipeline.

8. The liquid level measurement method of claim 7, wherein the solenoid valve group comprises a first solenoid valve and a second solenoid valve, each solenoid valve comprising a first port, a second port, and a third port, the first port and the second port being connected to each other when the solenoid valve is closed, and the second port and the third port being connected to each other when the solenoid valve is opened;

the liquid level measurement apparatus further comprises a tee joint; and the first pipeline comprises a first pipe, a second pipe, a third pipe, a fourth pipe, and a fifth pipe, the second port of the first solenoid valve is in communication with an air inlet end of the vacuum pump through the first pipe, an air outlet end of the vacuum pump is in communication with the second port of the second solenoid valve through the second pipe, the first port of the second solenoid valve is connected to the first port of the tee joint through the third pipe, the second port of the tee joint is in communication with the accommodating bottle through the fourth pipe, and the third port of the tee joint is in communication with the third port of the first solenoid valve through the fifth pipe.

9. The liquid level measurement method of claim 8, further comprising a clamping and fixing structure, wherein
the probe in the liquid level measurement circuit is fixed to the clamping and fixing structure, and the clamping and fixing structure has a relaxed state and a clamping state;
wherein in the relaxed state, at least one of the positive electrode conductor and the negative electrode conductor in the liquid level measurement circuit is not in contact with the measurement liquid in the liquid accommodation body; and in the clamping state, if the measurement liquid in the liquid accommodation body is higher than the preset liquid level, the positive electrode conductor and the negative electrode conductor in the liquid level measurement circuit are both in contact with the measurement liquid.

10. The liquid level measurement method of claim 7, further comprising a clamping and fixing structure, wherein
the probe in the liquid level measurement circuit is fixed to the clamping and fixing structure, and the clamping and fixing structure has a relaxed state and a clamping state;
wherein in the relaxed state, at least one of the positive electrode conductor and the negative electrode conductor in the liquid level measurement circuit is not in contact with the measurement liquid in the liquid accommodation body; and in the clamping state, if the measurement liquid in the liquid accommodation body is higher than the preset liquid level, the positive electrode conductor and the negative electrode conductor in the liquid level measurement circuit are both in contact with the measurement liquid.

11. The liquid level measurement method of claim 1, further comprising a clamping and fixing structure, wherein
the probe in the liquid level measurement circuit is fixed to the clamping and fixing structure, and the clamping and fixing structure has a relaxed state and a clamping state;
wherein in the relaxed state, at least one of the positive electrode conductor and the negative electrode conductor in the liquid level measurement circuit is not in contact with the measurement liquid in the liquid accommodation body; and in the clamping state, if the measurement liquid in the liquid accommodation body is higher than the preset liquid level, the positive electrode conductor and the negative electrode conductor in the liquid level measurement circuit are both in contact with the measurement liquid.

12. The liquid level measurement method of claim 1, wherein materials of the positive electrode conductor and the negative electrode conductor in the liquid level measurement circuit comprise an anti-oxidation material.

13. The liquid level measurement method of claim 1, wherein the reference electrical signal module comprises a first resistor and a second resistor; wherein a first end of the first resistor is electrically connected to a power source, a second end of the first resistor is electrically connected to the first end of the potential conversion module and a first end of the second resistor, and a second end of the second resistor is grounded; and the second resistor is an adjustable resistor, and a resistance value of the second resistor is related to the electrical conductivity of the measurement liquid, such that if the probe is immersed in the measurement liquid, the values of the electrical signals at the first end and the second end of the potential conversion module have a first magnitude relationship, and if the probe is not immersed in the measurement liquid, the values of the electrical signals at the first end and the second end of the potential conversion module have a second magnitude relationship, the first magnitude relationship being different from the second magnitude relationship.

14. The liquid level measurement method of claim 6, further comprising a clamping and fixing structure, wherein the probe in the liquid level measurement circuit is fixed to the clamping and fixing structure, and the clamping and fixing structure has a relaxed state and a clamping state;

wherein in the relaxed state, at least one of the positive electrode conductor and the negative electrode conductor in the liquid level measurement circuit is not in contact with the measurement liquid in the liquid accommodation body; and in the clamping state, if the measurement liquid in the liquid accommodation body is higher than the preset liquid level, the positive electrode conductor and the negative electrode conductor in the liquid level measurement circuit are both in contact with the measurement liquid.

* * * * *